Nov. 7, 1961     I. SPIAZZI     3,007,397
COMBINED PRINTING OF FIXED AND VARIABLE DATA
BY MEANS OF ADDRESS-PRINTING MACHINES
Filed July 7, 1958     13 Sheets-Sheet 4

Inventor.
Ivo Spiazzi
By: *Buhleinger* Attorney

Nov. 7, 1961  I. SPIAZZI  3,007,397
COMBINED PRINTING OF FIXED AND VARIABLE DATA
BY MEANS OF ADDRESS-PRINTING MACHINES
Filed July 7, 1958   13 Sheets-Sheet 5

Inventor:
Ivo Spiazzi
By: [signature]
Attorney

Nov. 7, 1961 I. SPIAZZI 3,007,397
COMBINED PRINTING OF FIXED AND VARIABLE DATA
BY MEANS OF ADDRESS-PRINTING MACHINES
Filed July 7, 1958 13 Sheets-Sheet 12

Inventor.
Ivo Spiazzi
By: Ehrlinger
Attorney

United States Patent Office 3,007,397
Patented Nov. 7, 1961

3,007,397
COMBINED PRINTING OF FIXED AND VARIABLE DATA BY MEANS OF ADDRESS-PRINTING MACHINES
Ivo Spiazzi, Milan, Italy, assignor to Fabbrica Italiana Macchine Aziendali, Milan, Italy, a company of Italy
Filed July 7, 1958, Ser. No. 746,957
Claims priority, application Italy July 24, 1957
10 Claims. (Cl. 101—57)

Often there arises the problem of combining the printing of comparatively fixed data, previously punched on metallic plates, with the printing of other data that is variable with gerater frequency or even at every printing, such as may be obtained from perforated cards.

The metallic plate affords the advantage of printing of a great number of data (about 500 values for an average plate) and the advantage of size of the characters.

Thanks to its low cost, the facility of perforation, the possibility of selection of different classes, and the possibility of perforating thereon the results of arithmetical operations, the perforated card appears to be particularly useful for introducing variable but not very numerous data (the capacity being limited to 80 or 90 values per card).

The combination of the two means thus allows utilizing the peculiar advantages of each system.

The combinations known so far have not used the advantages of each system, since each system had its own printing member separated from the other, or the card means piloted only the printing or non-printing of the plate.

It is the main object of the present invention to provide means for printing the data, which is contained on every plate, contemporaneously and on the same printed matter with the data expressed by means of perforations on the corresponding card. According to the present invention the perforations of the card control the positioning of type wheels whose characters when in printing position are adjacent to those printed by the plates and aligned with one of the lines thereof. In that way there results an arrangement of printing that is particularly useful in the case of the compilation of invoice lists or such wherein there is usually a description at the left hand of the printed matter and the record of the amounts at the right hand.

It is another object of the present invention to permit the setting of the type wheels by means of controls either from prevailingly mechanical perforated card machines, in which the transmission of the data is obtained by means of Bowden cables, or from electromechanical machines in which the control element is determined by pulses differently phased during the cycle of the machine according to the value of the perforated figure.

With said coupling the first condition is the control between the plate and the card to ascertain that both relate to the same subject.

For that purpose usually a control numeral serves which is marked both on the card and the plate by perforations, and which is compared by mechanical or electromechanical means according to whether the characteristic of the system of perforated cards is prevailingly mechanical or electromechanical, as said above. The method of comparison does not form an object of the present invention, but is conventional.

In the present description, since the system of comparison is not to be described, it is assumed that the perforated card is affixed to the same plate to which said data refers and which constitutes thus not only the printing matrix, but also the support for the card. Thus, there is no longer any need for comparing every plate with every card, since that operation will have been carried out by the operator that has inserted the card into the plate. The utilisation of this type of plate to control an adding member is described in same applicant's (Italian) patent No. 543,345.

It is another object of the present invention to provide means wherein a given content in perforation controls the printing and non-printing of the combined plate.

Other objects will appear from the following description which relates to one of the possible embodiments as illustrated by way of example in the accompanying drawings wherein:

Figure 10:
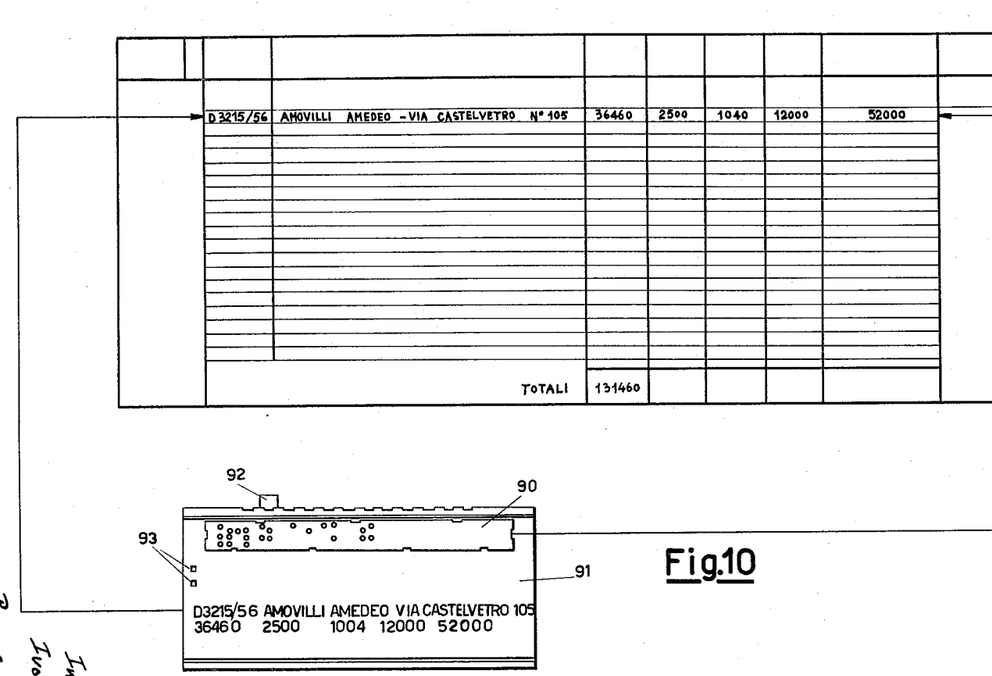
FIG. 10 is a front view of a plate and showing also an example of the printing obtainable with the machine.

The machine illustrated has a surface 1, for printing and sliding of the plates sustained by a frame 2. On the printing surface there is a loading tank 3, a printing arm 4 and a reading head 5 of data perforated on a card 90 attached to the metallic plate 91 (FIG. 10).

Figure 1:
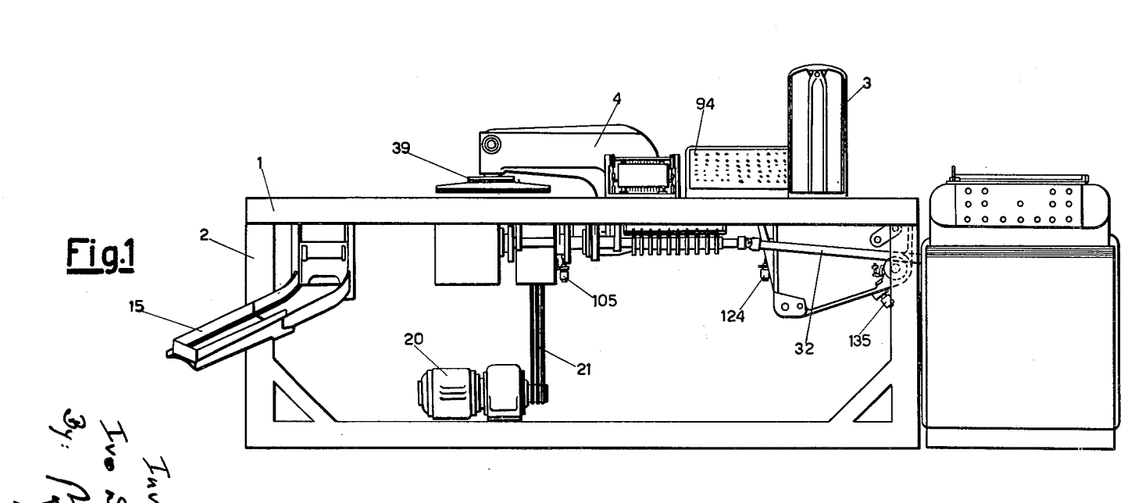
FIG. 1 shows a front view of the instant printing machine wtih the adding apparatus side by side.
Figure 2:
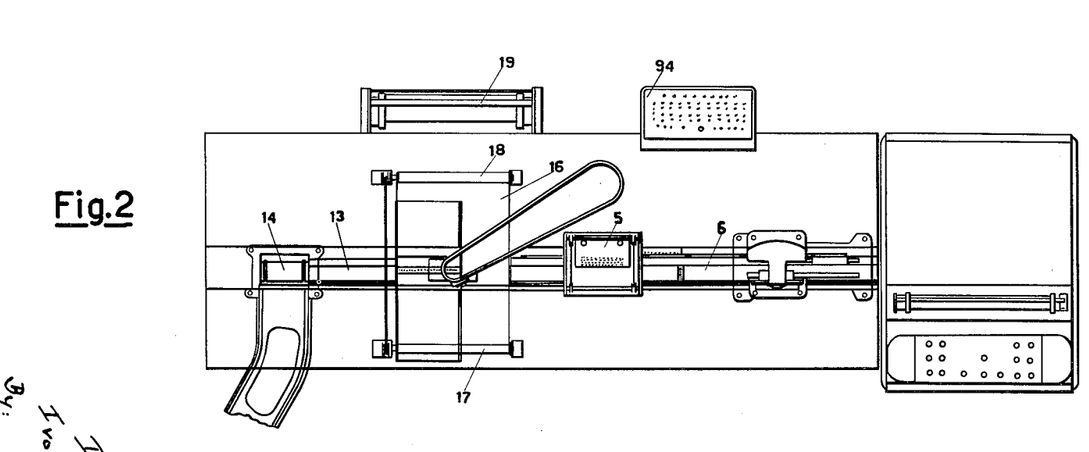
FIG. 2 shows a top view of the machine.

On the printing surface there is a plate guide 6 wherein there slide the metallic plates in a manner known per se. Said plates are forwarded from the loading tank 3 to a subsequent position 7 (FIG. 4) which is followed by a position 8 for reading the selecting marks, a position 9 for reading the data perforated on the card, a subsequent intermediary position 10, a printing position 11 for the data punched on the plate, a printing position 12 for the variable data coming from the values perforated on the card (or from an arithmetic elaboration thereof) and finally the position 13 that precedes the discharging position 14. In said position 14 the plates are collected in a manner known per se within a plate-collecting box 15. Above the printing positions 11 and 12 there runs an inking tape 16 (FIG. 2) which is wound on and off two reels 17 and 18. In correspondence with the printing positions 11 and 12 it will be possible to have a device for feeding paper from the roll 19.

Figure 3:
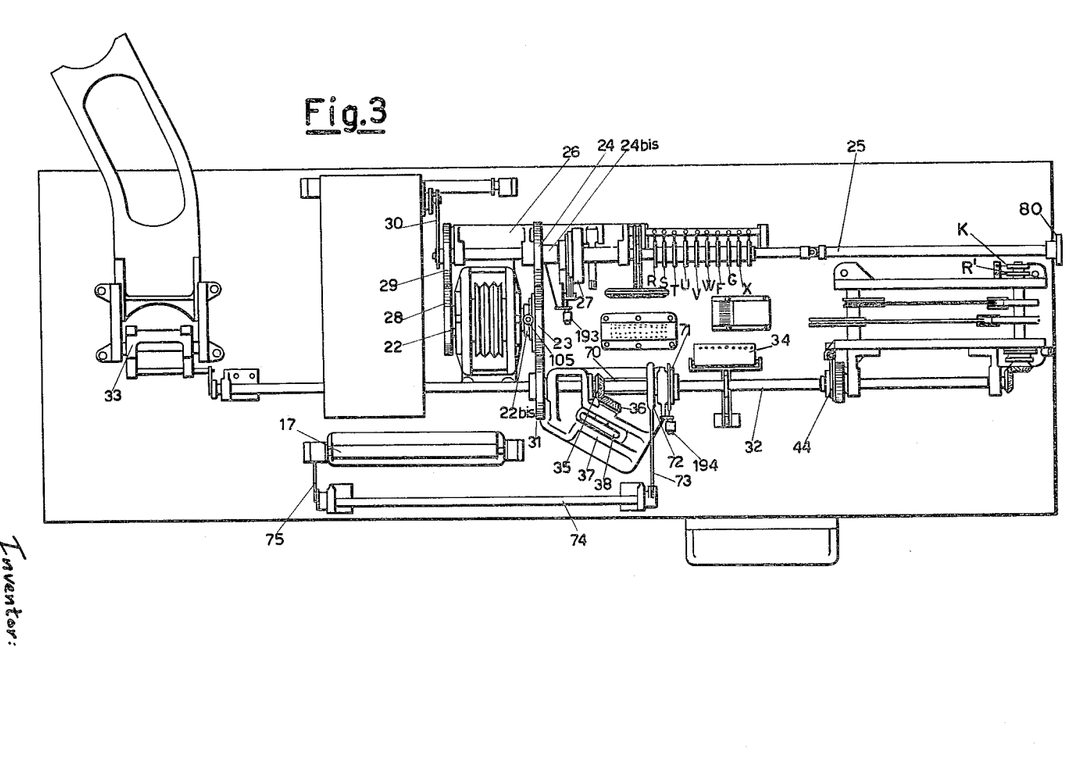
FIG. 3 shows a bottom view of the machine.
Figure 16:
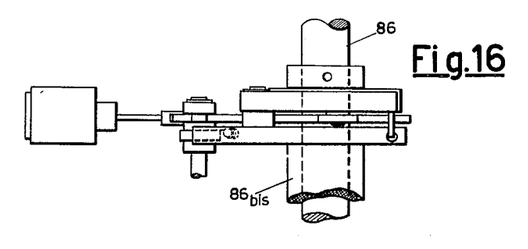
FIGS. 16, 17, 18 illustrate the kind of coupling used.
Figure 17:
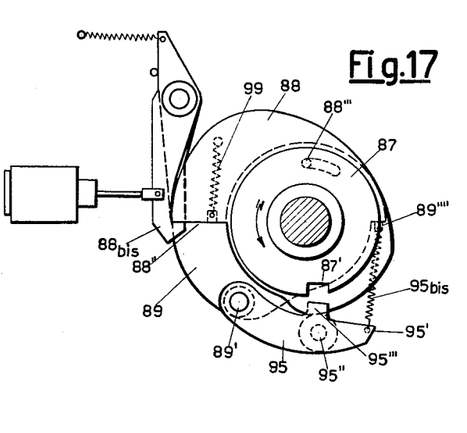
Figure 18:
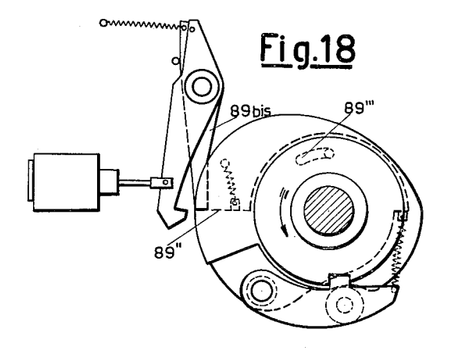

On the supporting frame 2 there is fixed a motoreducer 20 which by means of V-belts 21 rotates a drive shaft 22 (FIG. 3) by which the movement is transmitted, through a main coupling 22bis and a gear 23, which is in mesh with the gear 24, to the bushing 24bis which is loose on the shaft 25 that is supported by the support 26. The coupling utilised is of the conventional one-cycle type wherein the excitation of a solenoid releases a cam that permits a tooth of the moved part to penetrate into a notch of the moving part as visible in FIGURES 16, 17, 18.

The movement of the gear 24 is transmitted by the bushing 24bis through a single cycle coupling 27 to the reading head for the data perforated on the card that is inserted into the plate. Moreover, by way of the gear 28 which is in mesh with the gear 29, the movement is transmitted to the shaft 25, from which, by means of a coupling system 30, an underbench printing system for printing by means of type wheels is actuated. The shaft 25 extends as far as the flange 80 for coupling with the drive shaft for the combined adding device, and carries the main cams R, S, T, U, V, which actuate the contacts 160, 161, 163, 162, 165 (FIG. 15) respectively, the function whereof will be indicated in the description of the electric system.

The shaft 25 thus has continuous rotation even when the printing machine is not in operation. Through gear 31, which is in mesh with gear 23, the movement is transmitted to the shaft 32 on which there is loose the bushing 70, which is coupled to the shaft 32 through a single-cycle coupling 71.

Onto the bushing 70 there is fitted the bevel gear 35 which is in mesh with another gear 36 that is fitted onto the shaft 37 which through eccentric 38 and lever systems known per se, controls the lowering of the pad 39.

To the same bushing 70 there is coupled the eccentric 72 which by means of the connecting rod 73 controls the reciprocating movement of the control shaft 74 for operating the reel device 19. The shaft 74 through couplings 75 controls the stepwise forward drive of the drive roll 17 of the tape device. The shaft 32 moreover controls through a system of couplings which will be better described hereinafter, the system of the double extractors of the plate feed, the task of which is to take away the last printed plate so as to leave space for the descent of the subsequent plate; this device is known per se in conventional address-printing machines.

From the shaft 32 there is further effected the transmission of the movement to the whole of the contacts 34, which are entrusted with the task of advising of the presence of indicators 92 (FIG. 10) inserted in said plate. Also this device is known per se in conventional applications of address-printing machines.

As said above, the shaft 25 is in continuous rotation so that the combined adding device can operate, particularly for printing totals, even if all of the controls of the printing machine are not in operation.

Figure 7:
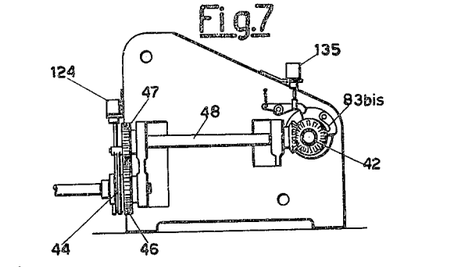
FIG. 7 is a side view of the assembly of FIG. 6.
Figure 8:
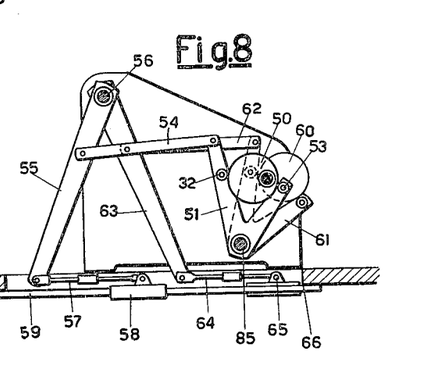
FIG. 8 is a vertical section of the assembly of FIG. 6.
Figure 9:
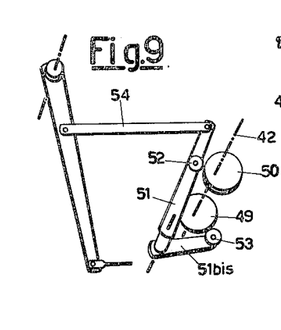
FIG. 9 is a perspective view represented diagrammatically, of the control for one of the two extractors.

The shaft 32 (FIGS. 6, 7, 8, 9) is connected to a spur gear 46 (FIG. 7) through a coupling 44 which is actuated by the solenoid 124. Spur gear 46 is in mesh with another spur gear 47 which is attached to one end of the shaft 48, by which, through bevel gears 40 and 41, the rotation of the shaft 42 is controlled. On shaft 42 there slides a bushing 83 which can be coupled to the shaft 42 through a coupling 83bis; on said bushing there are fitted (FIG. 8) the cams 60 which act upon the rollers of the levers 61 on the pivot 85. By those levers, a reciprocating movement is transmitted, through the rod 62 and lever 63, which is fulcrumed at one end of the pivot 56, and connected through a link 64, to a slide 65 on which the extractor 66 is fixed. The to and from movement being controlled by different cams, will thus be positive, in the two directions. Onto the same shaft 42 (FIG. 9) there are fitted the cams 49 and 50 which, through a system of levers 51, rollers 52, 53 and link 54, transmit in analogous manner through rods 55 and link 57, movement to the slide 58 and thence to the extractor 59. The two extractors 59 and 66 engage the plates respectively at the guiding front border thereof and on the rear border. The extractor 59 (FIGS. 4 and 5) is provided with teeth 67, 68 and 69 such that at every forward movement of the extractor 59 the plates are displaced from position 10 to position 11, from position 12 to position 13 and from position 13 to the discharge 14.

On the contrary, the extractor 66 transmits through the teeth 76, 77, 78, 79, 81 and 82, during the forward stroke, the forward feed movement from the loading tank to position 7, from position 7 to position 8, from position 8 to position 9, from position 9 to position 10, from position 10 to printing position 11 and from position 11 to position 12. As illustrated by the diagram of the phases in FIG. 11 at H and I, the movements of the two extractors are out of phase by 180° in such a way that if it is considered that in the initial starting position of the machine (FIG. 4) the position 11 is free from plates, the extractor 59 in the first half cycle will feed the plates from position 10 to printing position 11, from position 12 to position 13 and from position 13 to the discharge. In that way, at the first advance effected there occurs the distribution of plates as illustrated by FIG. 5 in which the position 10 and the position 12 are free from plates.

Figure 12A:
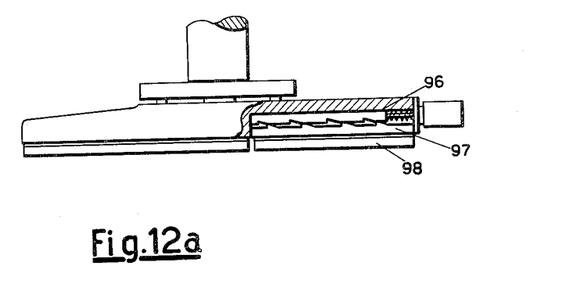
FIGS. 12a and 12b, respectively, show the printing pad assembly in two operative positions.

There follows the printing of the plates in position 11 as well as of the underbench printing group which is lifted to the position 12 (cycle O of FIG. 12).

Figure 4:
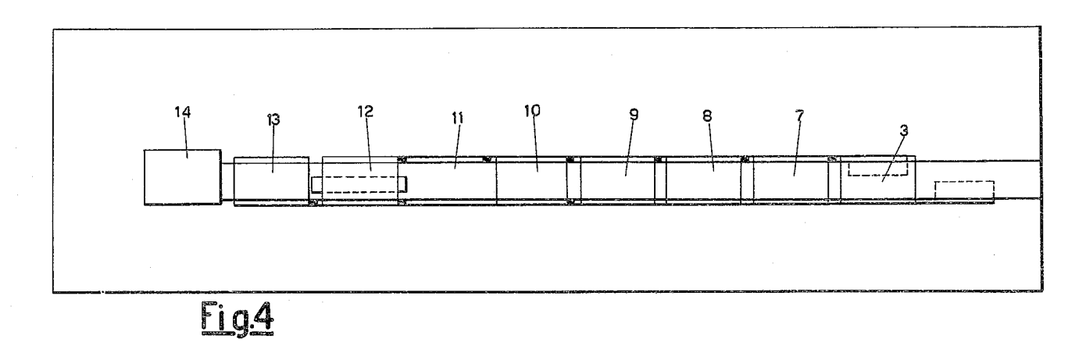
FIGS. 4 and 5 show a diagrammatical view of the sliding surface for the plates and illustrates the two extractors and the different positions of the plates.
Figure 5:
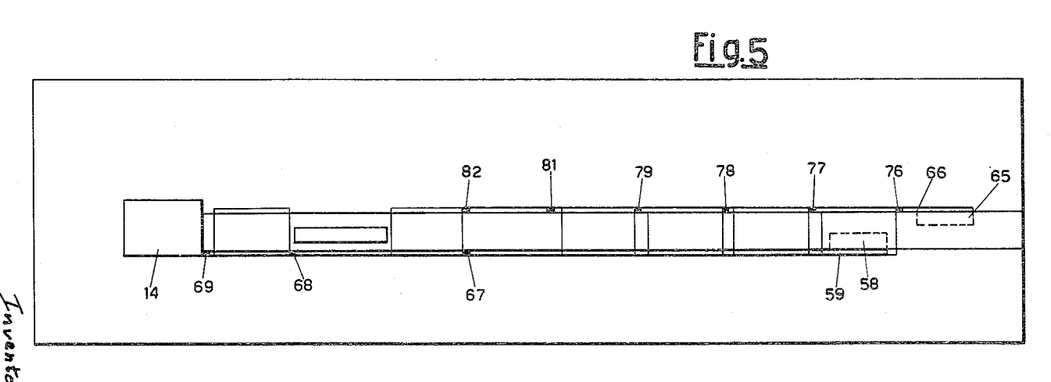
Figure 6:
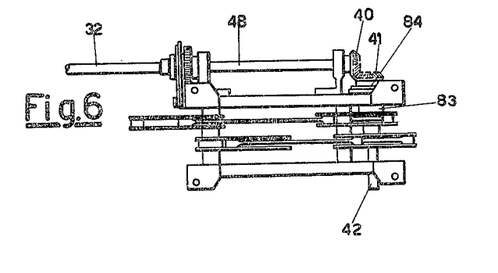
FIG. 6 is a top view of the control system for the two extractors.

In the second half cycle the extractor 59 returns to its starting position while the extractor 66 advances and takes the train of plates to the position illustrated in FIG. 4, thereby effecting advance from the loading tank 3 to position 7, from 7 to 8, from 8 to 9, from 9 to 10, from 11 to 12.

From position 10 there is no advance since at this stage this position is free from plates. If it is considered that the reading of the perforations takes place in the first half cycle, it is apparent that the plate read in position 9 is taken, in the same cycle, to position 10 and, in the first subsequent half cycle, from position 10 to 11.

Said plate thus will get to the printing position in the cycle subsequent to the reading cycle, namely, contemporaneously with the positioning of the type wheels as determined by the data read on the plate when the latter was in reading position 9.

Consequently, the data punched on the plate (in FIG. 10 said data are marked in heavy characters) will print in alignment with the numerical data coming from the card 90 through the combined adding device.

Figure 11:
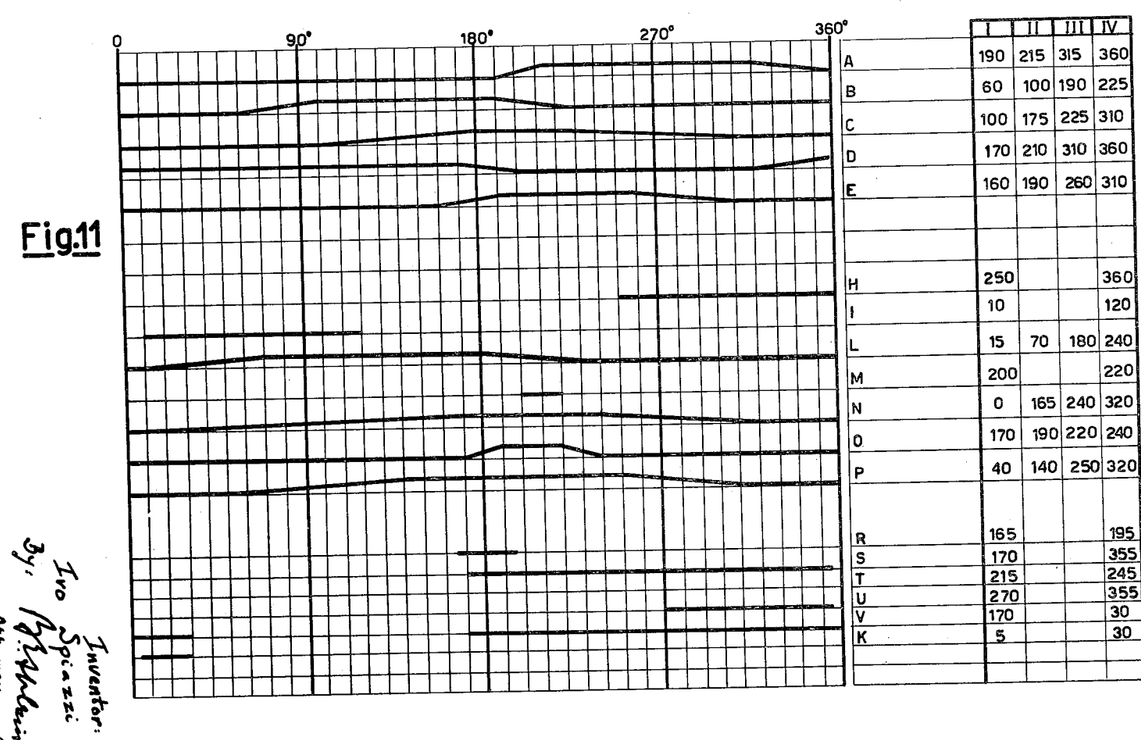
FIG. 11 shows a record of the different phases of the main members of the machine.

In FIG. 11 at M, N, O, P there are reported the phases of the main movement regarding the group of the type wheels and this is in order to show the correlation existing between that group and the printing machine to be described.

At A, B, C, D, R, instead there are shown the main phases of the movements of the combined adding device according to the preceding Patent 543,345.

By way of general orientation about the meaning of said movements, a short description of those movements is given.

At C there is indicated the movement of the universal reloading bar of the racks.

Between 100 and 175° there is the forward movement of the racks pulled by the respective springs and from 225° to 310° the return movement thereof to the rest position.

The engaging of the accumulators with the racks occurs according to the phase of A in the case of accumulation and according to B in the case of totals.

The phase of accumulation then is synchronous with the phase of reading of the perforated card (descent of reading head 5), phase L.

The discharge of the memory is phased, according to D and corresponds to the case of the totals of the accumulators; the phase E indicates the alignment of the racks by means of the special teeth.

With the preceding stages are connected those of the underbench printing groups or group of type wheels.

To the adding device there is connected a memorizing group. Transmission of the values is effected, in the cycle subsequent to that of accumulation of the values by the adding device, in the period from 0 to 165° according to N.

Said phase relates to the to and fro movement of the rack for setting values in the type wheels, which movement is synchronous to that of the rack for transmission of values from the memorizing group.

The return stroke to the rest position takes place for the two racks between 120° and 320°.

This group thus obtains the delay of one cycle as needed in order that the printing of the plate and of the data derived from the perforated card contained in said plate, should take place contemporaneously.

At P, same figure, there is indicated the printing selection of the group of the type wheels, namely the control system whereby only significant figures and zeros to the right hand of the last significant figure, are printed.

In the operation of the printing machine a particularity should be noted that occurs in the case of printing the total; in that case, in fact, there is no printing of the data punched in the plate, only the printing determined by the type wheels. In position 8 are sensed in a manner known per se those selection marks, indicators 92 or notches 93 (FIGURE 10), on the plate so as to control the closing of the contacts in accordance with the positions in which said marks are located. Said contacts are terminated by special terminals in the selection board 94, in such a way as to determine the carrying out of a certain type of total by a selected accumulator, as will be more fully set forth in the description of the electric circuit of FIGURE 15.

The plate preceding the one that determines the control of the total (which represents the last of the group from which a certain total is wanted), will thus find itself in reading position 9; and in the instant cycle the amounts from said plate will be transmitted to the combined adding machine.

Figure 12B:
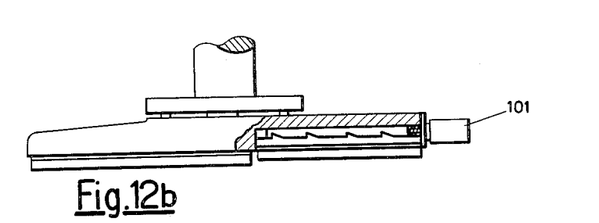

It is known that in the same cycle the plate will be advanced to position 10; and in the subsequent cycle it will be taken to the printing position 11, while the values read in this same cycle position the type wheels. The plate that follows and that carries the total control marks, will arrive at position 9, while the preceding plate already finds itself in position 11. In that position the plates remain for the instant cycle and for the subsequent one, in which the printing of the total is effected. In the cycle, in fact, of advancement from position 10 to 11, the advancement of the extractor 59 is not followed, as in the normal case of accumulation and printing, by the advancement of the extractor 66 since the solenoid controlling the coupling 83bis is not energised, as will be more fully illustrated during the description of the electric diagram. After the printing cycle of the last plate of the group, the solenoid 101 is energised (FIGURES 12, 15a), which attracts the toothed small lever 96 which thus carries its own notches into engagement with projections provided on the plate 97 supporting the printing pad 98. The pad is lifted (FIG. 12b) under the action of special springs in such a way that, when the whole of the pad is lowered to effect printing, the pad 98 will not exert any pressure upon the underlying plate, the data of which will not be printed, while there is effected the printing of the values set in the type wheels, namely of the desired totals. The plates will find themselves, at that time, in the accurate position of FIG. 5, whence the normal cycle of advancement can be resumed.

Figures 13A, 13B:
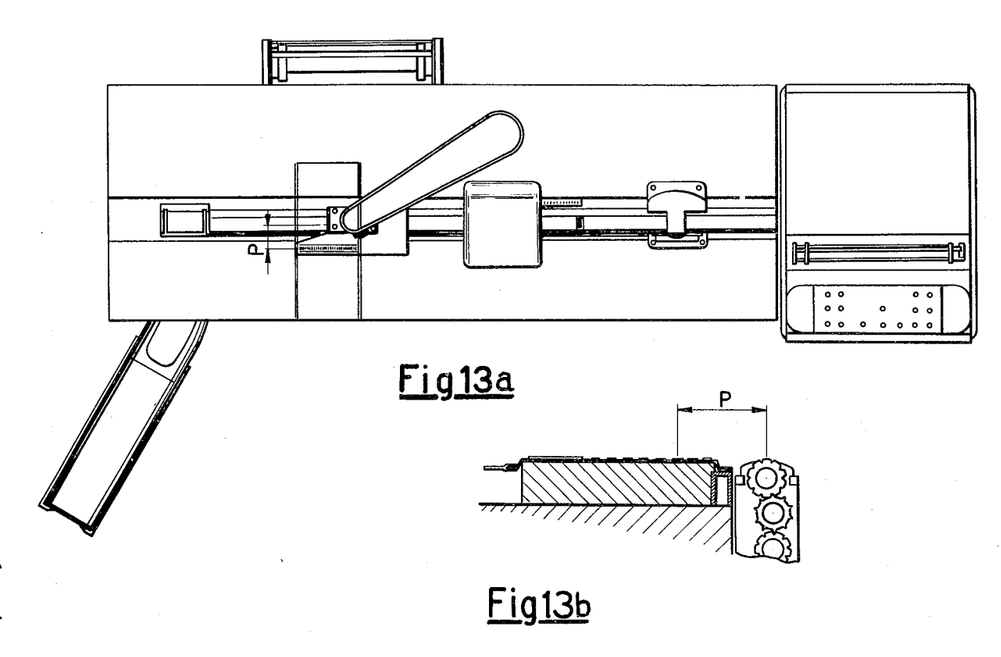
FIGS. 13a and 13b, respectively, show an alternative location of the groups of type wheels.
Figure 14:
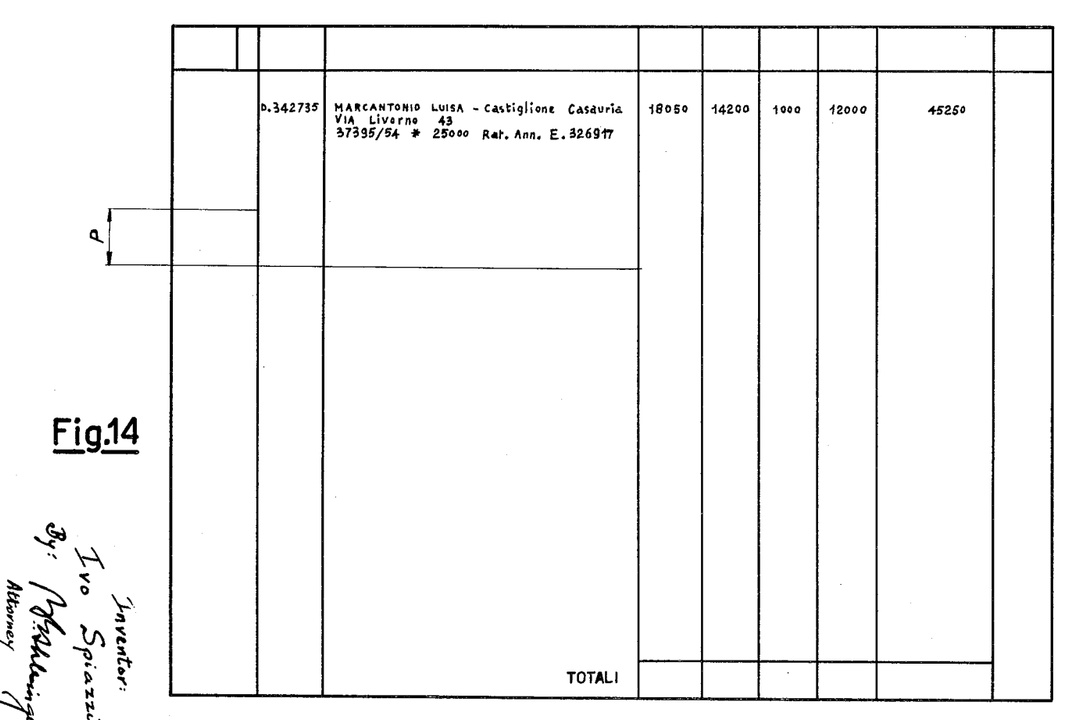
FIG. 14 shows an example of printing in a certain printing cycle according to the embodiment of FIG. 13.

As an alternative to the system so far described, in which the type wheels have the characters for printing in correspondence with the sliding movement of the plates, the printing group may be placed in front of the column of plates in such a way that the characters are spaced apart by the pitch P at the punched line with which alignment is desired (FIGS. 13a and 13b). This value depends on the dimensions of the various members and should be equal to the pitch P by which the form to be printed is fed forward (see FIG. 14).

According to that system there is only one extractor for advancement of plates (namely the extractor 66 as completed also by the small teeth of the extractor 59) since the type wheels are not covered by plates.

Two cycles after the position 9 the plate read will be printed in the printing position 11, while the type wheels will be positioned according to the values connected to the values perforated on the card of the very plate in the preceding cycle. The values of the type wheels will in fact be printed one cycle prior to the printing of the plate in a position advanced by the pitch P with respect to the position in which the printing of the plate takes place, that precedes the considered one. In the subsequent cycle the sheet of paper will be fed forward by the pitch P thereby aligning the printing obtained from the type wheels with that to be made by the corresponding plate.

Contemporaneously the numeric values of the plates that follow will be printed and so the cycles follow in succession while always aligning corresponding values and letters. The mechanism for printing the totals only is quite analogous to the one illustrated previously.

DESCRIPTION OF OPERATION

*Advancement (forward feeding) of plates and auxiliary controls*

The coupling 22bis is controlled by the magnet 105 the energising of which may be effected either by the closing of the contact 106 (FIG. 15), actuated by means of a push-button by the operator, or by the contact 110/1 of the relay 110 energised by the key 107 and self-fed by its own contact 110/2. The key 107 is called "continuous running" because if that key is actuated the machine carries on its cycles without interruption.

Figure 15:
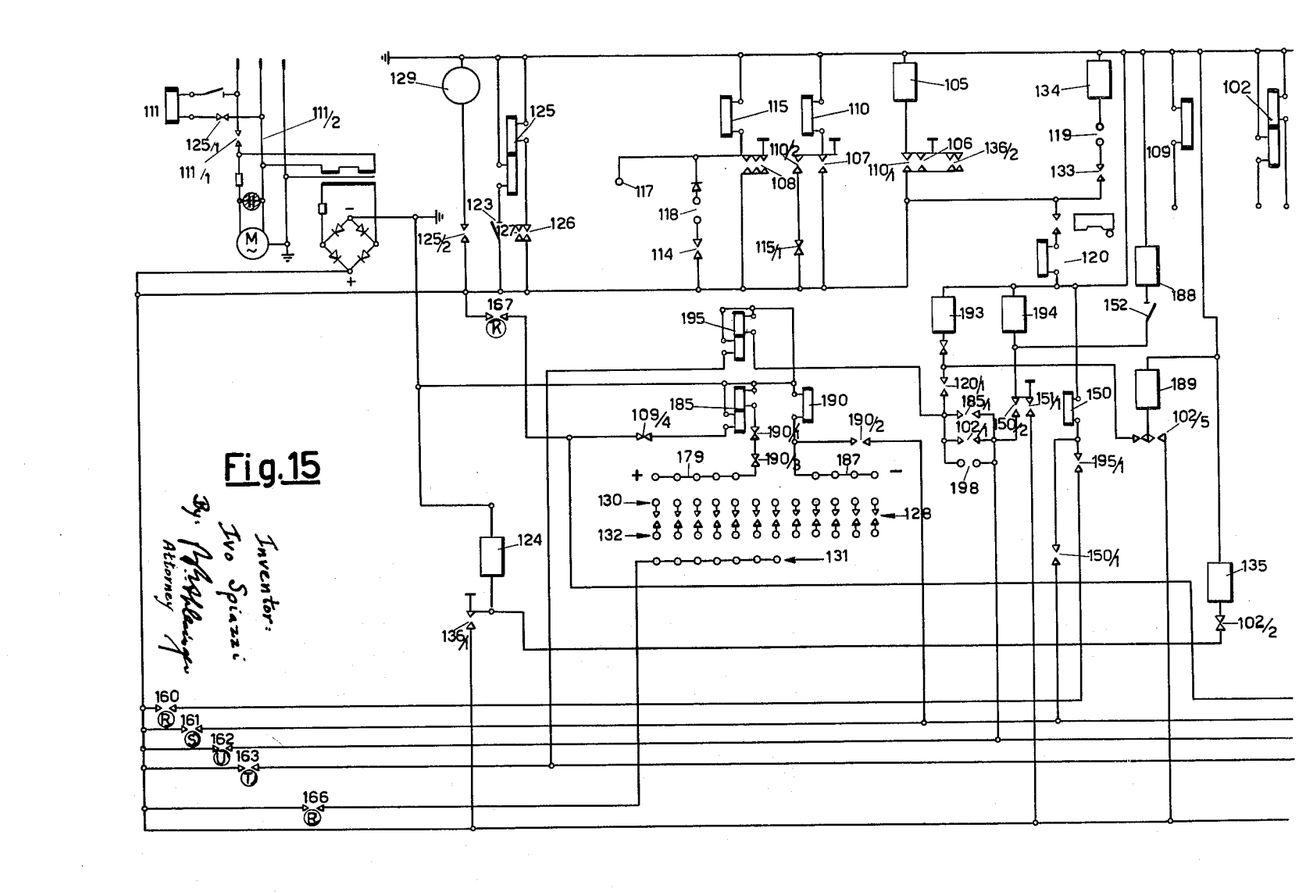
FIG. 15 showing the electric diagram of the machine.

The relay 110 may be de-energised by the opening of the contact 115/1 belonging to the relay 115, called stop relay, which is energised when the push-button 108 for stopping the machine is actuated, or when the contact 114 is closed owing to the presence of a particular plate called group plate, providing the connection at the terminals 118 has been pre-set on the main switchboard (panel or connections) of the machine.

The relay 115 may also be actuated if the terminal 117 is connected to one of the terminals 130 of the contacts 128, which are closed by the presence on the plate of indicators 92 or notches 93, according to the embodiment known per se of conventional address-printing machines.

The bi-stable relay 125 serves as a protection for the operator in case he introduces his hand under the printing pad, in which case the contact 126 is closed. This relay 125 serves also to prevent the plate from jamming (closing of the contact 127). The opening of the contact 125/1 in fact de-energizes the switch 111 whose contacts 111/1 and 111/2 in opening cut off current to the motor M; the closing of the contact 125/2 instead energises the brake 129 applied on the shaft of the motor thereby stopping the latter instantaneously.

The relay 125 is deenergized by depressing the push-button 123, on elimination of the cause of its becoming energised.

The magnet 134 represents the driving part of an electric stroke counter which, if the connection 119 is effected, is energised at every printing by means of the closure of a contact 133 actuated by the printing arm.

The forward feeding of the plates takes place through couplings 44 (FIG. 3) and 83bis (FIG. 7) controlled by the magnets 124 (FIG. 15) and 135, the energising of which determines respectively the coupling of the shaft 48 to the drive shaft 32 and of the bushing 84 to the shaft 42 and, therefore, the actuation of the extractors 59 and 66. The two couplings are actuated contemporaneously, save in the case of the total in which the coupling 83bis is not actuated since the solenoid 135 is not energised. In fact by actuating the key 136 one closes the contact 136/1 for energizing the solenoids 124 and 135, as well as the contact 136/2 that energises the solenoid 105 for engaging the main coupling of the machine 22bis. That manual operation permits the advancement (forward feed) of the plates independently without printing.

*Controls of printing, reading of cards, under-bench writing and combined tabulator*

The printing coupling 71 (FIG. 3) is controlled by the solenoid 194; (FIG. 15) the reading control for the perforated card 27 is controlled by the solenoid 193; the under-bench printing group is controlled by the solenoid 188; and the combined adding device is controlled by the solenoid 189.

These solenoids are controlled in the way set forth hereinafter.

In the case of the selecting operation, in which certain categories of plates are printed or not printed according to the marks 92 and 93 (FIG. 10) recorded on the plates and to the connections effected on the selection panel (terminals 131, 132, 130, 179, 187), operation is as follows:

Through the contact 166 of the cam R' (FIGS. 3 and 15), which is rotated at every advance (forward feed) of the extractors, there is supplied voltage to the terminals 131, by which, through connection to the inlet terminal 132, either by indicators or notches of the plates the contacts 128 are closed. Current is thus fed to the terminals 130 and here, through another connection to the terminals 179, the coil is energised for the actuation of the bi-stable relay 185. Voltage may not reach said coil if the series contact 190/1 is opened, the relay 190 having been energised.

This relay may receive voltage from the terminals 131, 132, contact 128 and terminal 187. The relay 190 is called negative relay because a connected selection prevents attraction of the relay 185, as indicated above and, therefore, prevents, as will be seen, the printing of the said plate. The relay 190 has self-retention by the contact 190/2 fed by the contact 161 of the cam S.

The energising of the relay 185 closes the contact 185/1 whence:

(a) The solenoids 193 and 189 are energised (for control of the reading and adding device) if the contact 120/1 of relay 120 is closed, that is, if there are plates in the machine, for the duration of the closure of the contact 162 of the cam U;

(b) The bi-stable relay 195 is energised with closure of the contact 195/1 for feeding the relay 150; this relay however is not energised in this cycle, since the period of closure of the contact 160 actuated by the cam R is already past.

In the subsequent cycle, there is the cycle of accumulation of the adding device according to the phase B of FIG. 11 and the reading of the plates according to the phase L of the same figure.

In this second cycle, on closing the contact 160 of the cam R, the relay 150 is energised, with self-retention through the contact 150/1, which receives current in the period of closure of the contact 161 actuated by the cam S. In the subsequent phase, the contact 163 of the cam T energises the second coil of the bi-stable relay 185 which is thus returned again to normal position, so as to be able to receive a further pulse through the contact 185/1.

Through the contact 150/2 of the relay 150, at the time of operation of the cam V, there are energised the solenoids 194 for control of printing and 188 for control of under-bench printing, whose action will be performed in the cycle to follow (phases M, P and O respectively). In that way the printing of the plate and of the variable data through type-wheels takes place in the cycle subsequent to the card-reading cycle and accumulation cycle, as called for by the plate feed and printing system as described together with the mechanical members of the instant machine.

The contact 151/1 connected in parallel with the contact 150/2 can determine the printing independently of the machine cycle indicated above.

The switch 152 prevents energising of the solenoid 188 for underbench printing in case that group is not to be operated.

In the case of normal operation of the machine, that is, in "non-selection," the connection 198 is made which by shunting the contact 185/1 always determines the actuation of the solenoids for control of printing, accumulation, underbench printing, that is, independently of the closing of the selection contacts 128.

Another closure of the feeding circuits for the main solenoids of the machine is had by means of the contact 102/1 controlled by a relay energised every time the combined adding device performs a total. In the diagram there is indicated the bi-stable relay 102 without however completing the circuit thereof since said circuit forms part of the adding device.

The return of the relay 185 to its original positions takes place on closure of the contact 167 actuated by the cam K; this cam turns at every forward feed of the plates.

The return to the normal position of the relay 195 takes place at the time of operation of the cam T.

In FIG. 15, there is shown the relay 102 forming part of the combined adding machine already mentioned, which is energised at every performance of a total, thereby determining among other things the opening of the contacts 109/3, 109/4 in series, respectively, with the two coils of the relay 185, thereby preventing the pulses generated by the cams R' and K from shifting during said cycles the position assumed by the relay 185.

An analogous contact 102/2 is put in series with the magnet 135 thereby preventing—during the performance of a total—the forwarding of the plates as already set forth in the description of the mechanical parts.

Figure 15A:
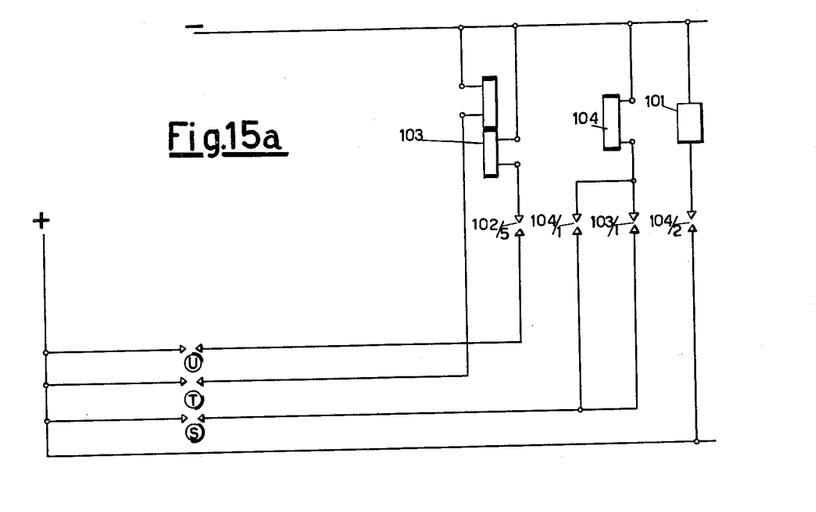
FIG. 15a shows diagrammatically the electric control circuit of the printing pad for printing totals.

In FIG. 15a there is illustrated the control circuit for the solenoid 101 whose energisation determines the printing only of the data set in the type wheels, as already previously indicated.

The relay 102 of the adding device, of which we have already encountered various contacts in the circuits of the printing device, has a further contact 102/5 that is closed during the performance of a total at the time of operation of the cam U, thereby energising the bi-stable relay 103.

The closure of the contact 103/1 determines, in the subsequent cycle, at the time of operation the cam S, the energising of the relay 104, which is self-retained at the contact 104/1 controlled by the cam S.

The contact 104/2 determines the energising of the solenoid 101, which, as seen, determines the printing only of the data of the type wheels.

The bi-stable relay 103 is then de-energised at the time of operation of the cam T thus restoring the original conditions.

Figure 19:
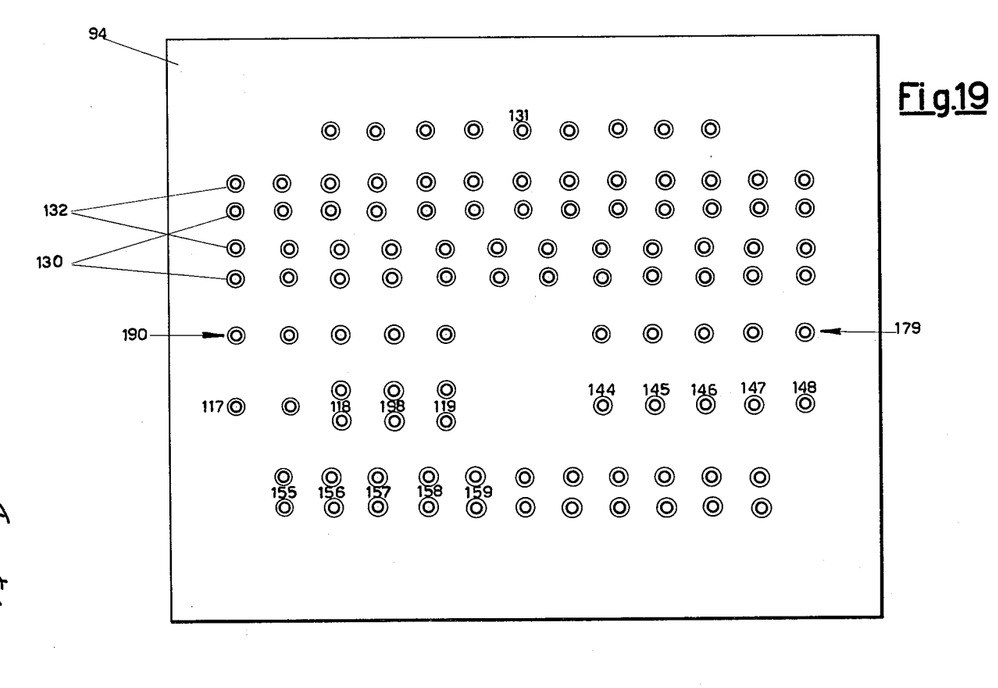
FIG. 19 shows the switchboard of the machine.

In FIG. 19 there is represented the selection panel with indication of the various terminals mentioned in the course of this description (switch-board).

I claim:

1. In a printing machine including a surface along which a plurality of plates having data physically represented thereon are fed successively through a plurality of stations, said stations including a printing station and an intermediate station adjacent said printing station, first and second means operable during a first half cycle and a second half cycle of operation, respectively, for advancing said plates through said stations, said first means acting during said first half cycle to advance one of said plates from said intermediate station to said printing station, means for printing the data represented on said one plate when said one plate is in said printing station, said second means during said second half cycle advancing said one plate out of said printing station and advancing another one of said plates to said intermediate station, 2. In a printing machine including a surface along which a plurality of plates having data physically represented thereon are fed successively through a plurality of stations, said stations including an intermediate station, a first printing station adjacent said intermediate station, and a second printing station adjacent said first printing station, a plurality of type wheels positioned at one of said printing stations, means for feeding sheet material, on which data is to be printed, over said printing stations, first and second means operable during a first half cycle and a second half cycle of operation, respectively, for advancing said plates through said stations, said first advancing means acting during said first half cycle to advance one of said plates from said first intermediate station to said printing station and to advance a second plate away from said second printing station, said second advancing means acting during said second half cycle to move said one plate away from said first printing station to said second printing station and advancing another plate to said intermediate station, and means for printing the data represented on said one plate and on said type wheels onto said sheet material when each plate is at said printing stations.

3. In a printing machine including a surface along which a plurality of plates having data physically represented thereon are fed successively through a plurality of stations, each of said plates having a perforated card attached thereto, said perforations on each of said cards corresponding to predetermined values, said stations including a card reading station, an intermediate station, a first printing station adjacent said intermediate station, and a second printing station adjacent said first printing station, a plurality of movable type wheels positioned along said surface at said second printing station, means adjacent said reading station for sensing the values represented on said perforated card to selectively position said type wheels in accordance therewith, means for feeding sheet material, on which data is to be printed, to said first and second printing stations, first and second means operable during a first half cycle and a second half cycle of operation, respectively, for advancing said plates through said stations, said first means acting during said first half cycle to advance one of said plates from said intermediate station to said first printing station and a second plate away from said second printing station, means for printing the data represented on said one plate and the positioned type wheels onto said sheet material when said one plate is at said printing stations, said second means acting during said second half cycle to move said one plate away from said first printing station to said second printing station and advancing another plate to said reading station and advancing still another plate from the reading station to said intermediate station.

4. A printing machine according to claim 3 wherein said type wheels have numerical characters thereon, and said sensing means actuates a tabulating mechanism in accordance with the perforations on said card, and said tabulating mechanism in turn positions said type wheels.

5. In a printing machine including a surface along which a plurality of plates having data physically represented thereon are fed successively in a forward direction through a plurality of stations, said stations including a plate loading tank station, an intermediate station, a printing station, and a discharge station, first and second means operable intermittently during a first half cycle and a second half cycle of operation, respectively, for advancing said plates forwardly through said successive stations, said first means comprising a bar having small teeth engaging one border of certain of said plates to advance one of said plates from said intermediate station to said printing station and to move a second plate out of said discharge station, said second means comprising a bar having a plurality of small teeth for engaging the opposite border of certain of said plates, respectively, during operation of said second means to advance a third plate forwardly from the plate loading tank station and to advance said one plate from said printing position to said discharge position, and means for printing the data represented on each plate while each plate is at said printing station.

6. In a printing machine including a surface along which a plurality of plates having data physically represented thereon are fed successively in a forward direction through a plurality of stations, said stations including a printing station and an intermediate station adjacent said printing station, first and second means operable during a first half cycle and a second half cycle of operation, respectively, for advancing said plates forwardly along said surface through said stations, said first means including a first extractor, a first cam means for actuating said first extractor to cause said first extractor to move from a starting position to advance one of said plates from said intermediate station to said printing station and return said first extractor to said starting position during said first half cycle of operation, said second means including a second extractor, a second cam means for actuating said second extractor to advance said second extractor from a starting position to move said one plate out of said printing station and to advance another one of said plates to said intermediate station and to return said second extractor to starting position during said second half cycle of operation.

7. In a printing machine including a surface along which a plurality of plates having data physically represented thereon are fed successively through a plurality of stations, said stations including a printing station and an intermediate station adjacent said printing station, a first coupling, a second coupling, said first and second couplings each being engageable during a respective cycle of operation, a first means operable when said first coupling is engaged during a first half cycle of operation for advancing one plate from said intermediate station to said printing station, a second means including said second coupling when engaged during a second half cycle of operation advancing said one plate out of said printing station and advancing another plate to said intermediate station, means for printing the data represented on each plate when each plate is in said printing station, and means for selectively engaging and disengaging said first and second couplings.

8. In a printing machine including a surface along which a plurality of plates having data physically represented thereon are fed successively in a forward direction through a plurality of stations, said stations including an intermediate station, a first printing station adjacent said intermediate station, and a second printing station, a plurality of type wheels positioned along said surface adjacent one of said printing stations, means for holding sheet material, on which data is to be printed, adjacent said first and second printing stations, a first coupling, a second coupling, a third coupling, first means including said first coupling operable, when said first coupling is engaged, for advancing one of said plates through said intermediate station to said first printing station, second means, including said second coupling, operable, when said second coupling is engaged, to move said one plate away from said first printing station to said second printing station and to advance another plate to said intermediate station, drive means for said first and second means including said third coupling when engaged, means for printing the data represented on each plate and on said type wheels on said sheet when each plate is at said printing stations, and means for selectively engaging and disengaging said couplings.

9. A printing machine including a surface on which a plurality of plates having data physically represented thereon are fed successively in a forward direction through a plurality of stations, each of said plates having a perforated card attached thereto, said perforations on each of said cards corresponding to predetermined values, said stations including a card reading station, an intermediate station, a first printing station adjacent said intermediate station, and a second printing station adjacent said first printing station, a plurality of type wheels positioned along said surface adjacent said second printing station, means for inking said type wheels and said plates, first, second and third single cycle couplings, first means operative when said first coupling is engaged to advance one of said plates from said intermediate station to said first printing station and to move another plate away from said second printing station, second means operative when said second coupling is engaged to move said one plate away from said first printing station to said second printing station and to advance another of said plates to said intermediate station, drive means including said third coupling, when engaged, for activating both said first and second means, means adjacent said reading station for sensing the values represented on said perforated card to selectively position said type wheels in accordance therewith, means for feeding sheet material, on which data is to be printed, across said first and second printing stations, means for printing the data represented on each plate onto said sheet material when each plate is at the first printing station, means including a fourth single cycle coupling, when engaged, to activate said card sensing means, means including a fifth single cycle coupling, when engaged, for actuating said type wheels to print onto said sheet material at said second printing station, means including a sixth single cycle coupling for causing the operation of said sheet material feeding means and for causing the operation of said inking means, and means for selectively engaging and disengaging all of said single cycle couplings.

10. A machine according to claim 9 wherein each of said couplings is engaged and disengaged by the operation of a solenoid, and having circuit means for selectively energizing and deenergizing each of said solenoids.

References Cited in the file of this patent
UNITED STATES PATENTS

| | | |
|---|---|---|
| 2,375,842 | Gollwitzer | May 15, 1945 |
| 2,425,149 | Gollwitzer | Aug. 5, 1947 |
| 2,582,187 | Wolowitz | Jan. 8, 1952 |
| 2,647,459 | Murphy | Aug. 4, 1953 |
| 2,697,396 | Gollwitzer | Dec. 21, 1954 |
| 2,710,406 | Gollwitzer | June 7, 1955 |